(12) United States Patent
Sehgal et al.

(10) Patent No.: US 12,490,737 B2
(45) Date of Patent: *Dec. 9, 2025

(54) COMPOSITIONS AND METHODS FOR LONG LASTING DISINFECTION

(71) Applicant: SPECIALTY OPERATIONS FRANCE, Lyons (FR)

(72) Inventors: Amit Sehgal, Potomac, MD (US); Kamel Ramdani, Princeton, NJ (US); Christopher Plummer, Flintshire (GB); Huw Evans, Wrexham (GB)

(73) Assignee: SPECIALTY OPERATIONS FRANCE, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,663

(22) Filed: Dec. 11, 2023

(65) Prior Publication Data

US 2024/0107997 A1 Apr. 4, 2024

Related U.S. Application Data

(63) Continuation of application No. 17/221,550, filed on Apr. 2, 2021, now Pat. No. 11,877,575, which is a continuation of application No. 16/379,708, filed on Apr. 9, 2019, now Pat. No. 10,980,230.

(60) Provisional application No. 62/654,647, filed on Apr. 9, 2018.

(51) Int. Cl.
  *A01N 25/10* (2006.01)
  *A01N 25/30* (2006.01)
  *A01N 33/12* (2006.01)

(52) U.S. Cl.
  CPC ............. *A01N 25/10* (2013.01); *A01N 25/30* (2013.01); *A01N 33/12* (2013.01)

(58) Field of Classification Search
  CPC ......... A01N 25/10; A01N 25/30; A01N 33/12
  See application file for complete search history.

(56) References Cited

U.S. PATENT DOCUMENTS 10,980,230 B2 * 4/2021 Sehgal ................... A01N 25/30
11,497,210 B2 * 11/2022 Sehgal ................... A01N 25/30
11,877,575 B2 * 1/2024 Sehgal ................... A01N 33/12

* cited by examiner

*Primary Examiner* — Shirley V Gembeh
(74) *Attorney, Agent, or Firm* — Jarrod N. Raphael

(57) ABSTRACT

An antimicrobial composition that includes: an antimicrobial component having at least one quaternary ammonium compound; a synthetic polymer that includes: at least one cationic monomer $A_b$, optionally, at least one anionic monomer $B_a$, and optionally, at least one non-ionic monomer $C_a$; an organic acid; and a surfactant selected from cationic surfactants, amphoteric surfactants and combinations thereof, wherein the composition is free of non-ionic surfactants. This composition when applied to a surface provides robust long lasting disinfection.

31 Claims, 1 Drawing Sheet

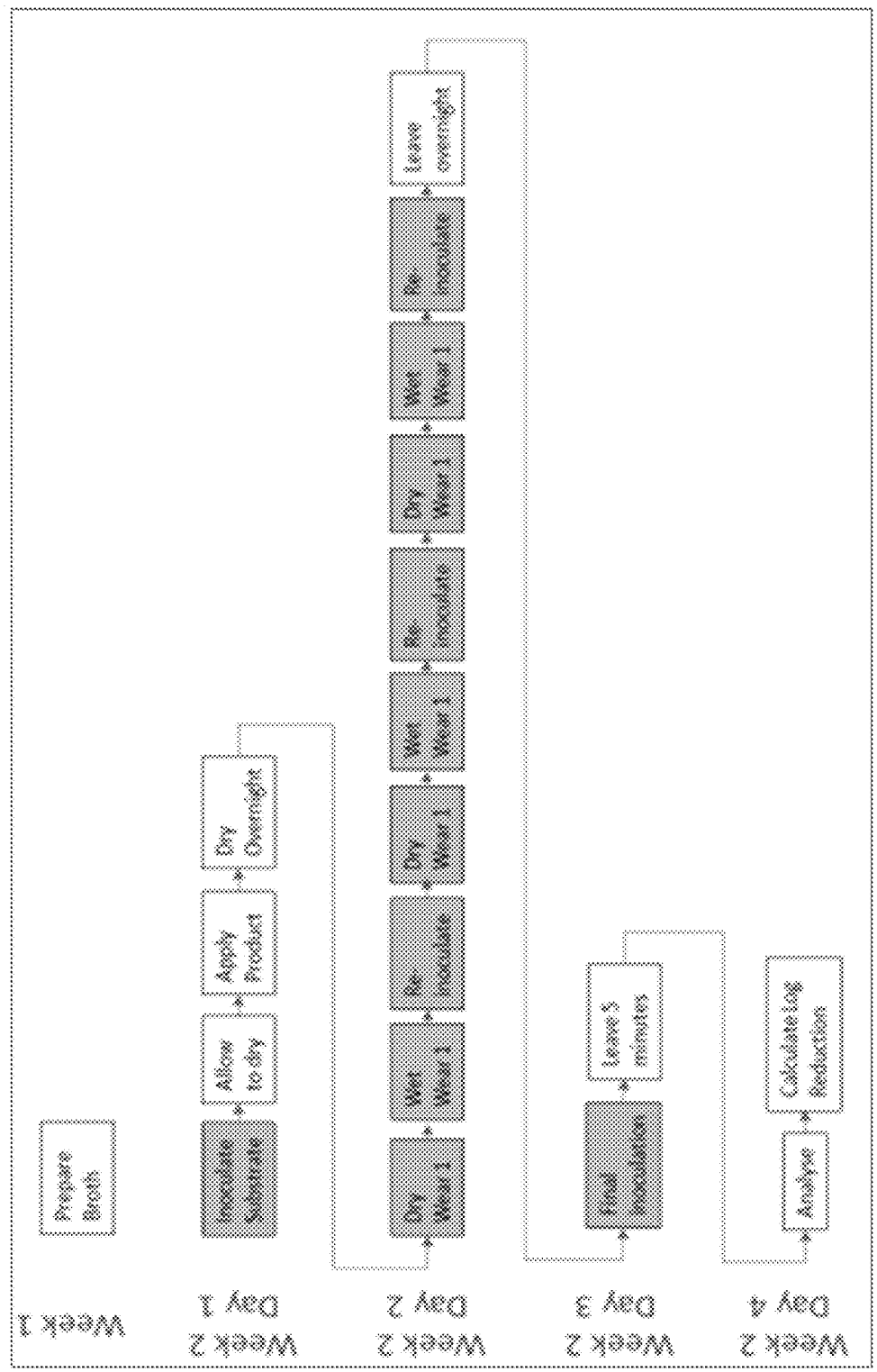

COMPOSITIONS AND METHODS FOR LONG LASTING DISINFECTION

CROSS-REFERENCE TO RELATED APPLICATION

This application is a continuation of U.S. patent application Ser. No. 17/221,550 filed Apr. 2, 2021, which is a continuation of U.S. patent application Ser. No. 16/379,708 filed Apr. 9, 2019, which claims the benefit of U.S. Provisional Application Ser. No. 62/654,647, filed on Apr. 9, 2018, incorporated herein by reference in its entirety.

BACKGROUND

It is often desirable to provide a biocidal surface on which microorganisms, many of which are potentially harmful, cannot survive at least for a given period of time. Most materials have surfaces that do not normally prevent microbial contamination. One useful way to improve the microorganism resistance of a surface is to treat the surface with a formulation that provides a biocidal effect and also prevents future growth until the next application.

One common method of treating a surface is to apply a layer of a liquid formulation to that surface and then dry the layer or allow the layer to dry. It is desirable that such liquid formulations are clear and remain stable during storage. It is also desirable that such liquid formulations spread evenly when applied to a hard, flat surface. It is desirable that such films, when dry, have one or more of the following desirable properties: clarity, non-tackiness; durability to repeated touching or wiping; no long term build-up; and ability to maintain biocidal efficacy under normal use for an extended period of time after application to a surface.

Antimicrobial compositions commercially available as disinfectants, or as cleaners with disinfecting activity, typically achieve microbial kill at 99.9% or greater. However, re-soiling or contamination of the surface requires additional treatments with such compositions. A need, therefore, exists for antimicrobial formulations that provide high microbial kill without the need for repeated applications. However, designing compositions that meet the above requirements is a difficult task in view of unpredictable and complicated interactions between ingredients.

BRIEF DESCRIPTION OF THE DRAWINGS

FIG. 1 is flow chart depicting the RSS-12h analysis conducted in the Examples.

SUMMARY

The present disclosure provides hard surface treatment compositions comprising: an antimicrobial component comprising at least one quaternary ammonium compound; a synthetic polymer comprising: at least one cationic monomer $A_b$, optionally, at least one anionic monomer $B_a$, and optionally, at least one non-ionic monomer $C_a$; an organic acid; and a surfactant selected from cationic surfactants, amphoteric surfactants and combinations thereof, wherein the composition is free of non-ionic surfactants. Also presented are methods of providing a surface with residual antimicrobial action that include the step of applying a composition of the present disclosure to the surface. The present disclosure also provides a substrate with residual antimicrobial action comprising a substrate wherein at least a portion of the substrate is coated with a composition of the present disclosure.

DETAILED DESCRIPTION

The present disclosure relates to compositions that provide a longer lasting disinfection to treated surfaces and are free of non-ionic surfactants. The present compositions achieve microorganism (e.g. bacterial, viral, or fungal) kill of at least 95% or greater, (e.g. 99.9% kill), for 12 to 24 hours obviating the need for repeated treatment. In order to substantiate 24 hour long-term sanitization claims with the United States Environmental Protection Agency (EPA), compositions are evaluated with the residual self-sanitization (RSS) method, EPA Protocol #01-1A (https://www.epa.gov/sites/producti on/files/2015-09/documents/cloroxpcol_final.pdf). For validating longer term disinfection, all extant test protocols emulate the maximum amount of recontamination and abrasion by touching and wiping anticipated before reapplication, typically a 24 hour period. An intermediate protocol with approximately half the level abrasion and re-soiling challenge to a surface is presented here as the "RSS-12 h" test protocol.

In an embodiment, a film formed from the composition kills at least 99.9% (e.g. log 3 reduction) of microorganisms according to the residual self-sanitizing (RSS) activity test (EPA Protocol #01-1A). In an embodiment, a film formed from the composition kills at least 99.9% (e.g. log 3 reduction) of gram-positive bacteria and gram-negative bacteria according to the residual self-sanitizing (RSS) activity test (EPA Protocol #01-1A).

Long lasting disinfection claims are substantiated by the RSS test, which challenges the applied composition by subjecting it to recontamination (re-inoculation with microorganisms) and abrasion (wear cycles). An intermediate test protocol, with approximately half the number of re-inoculations and wear cycles ("RSS-12 h") is used to predict disinfection that is durable up to 12 hours before reapplication of the test product. As outlined in FIG. 1, this procedure requires preparation of the test bacterial (microbial) culture over the first week (see EPA Protocol #01-1A) followed by testing in week 2.

The testing involves inoculating the surface with bacteria, followed by application of the product on the substrate and allowing it to dry. The substrate may be glass, polycarbonate, or steel. This substrate is then subjected to an abrasion-re-inoculation regime of 3 "wear cycles". The abrasion is conducted with a 1084 gwt. rectangular steel block covered with a cloth with an underlying thin polyurethane-foam layer. Each wear cycle is composed of a "dry" abrasion and a "wet" abrasion, the latter with the cloth cover having been wet with a mist of water using a Preval® sprayer. Each abrasion (dry/wet) is characterized by a back and forth motion of the block across the test substrate. Each abrasion cycle is followed by re-inoculation the surface with a bacterial culture. The RSS-12 h involves a 3-abrasion cycle/3-inoculations test as compared to the full RSS test that outlines a 6-abrasion cycle/6-inoculation test regimen. All other details of the test method are as outlined in the EPA Protocol #01-1A.

The test substrate is allowed to dry overnight and then finally inoculated again (sanitizer test) for 5 minutes, followed by neutralization of the entire substrate. Surviving bacteria is then harvested off the surface and cultured with serial dilutions on agar plates, allowing colony formation over 24-48 hours. Surviving bacteria are then counted as the number of colonies. The difference in bacterial count inoculated and surviving bacteria results in an efficacy evaluation in percent kill (e.g. 99.9% kill) or log-reduction (e.g. 3-log reduction) on a logarithmic scale. The bacteria in this test may be substituted for other microorganisms such as fungi or viruses. In an embodiment, microorganisms are selected from gram-positive bacteria (e.g *Staphylococcus aureus*), gram-negative bacteria (e.g. *Enterobacter aerogenes*), fungi, enveloped viruses, non-enveloped viruses, and combinations thereof.

The composition of the present disclosure is a liquid formulation. It is contemplated that one preferred method of making use of the composition of the present disclosure is to apply a layer of the composition to a substrate and dry the composition or allow it to dry. The act of applying a layer of the composition to a substrate and then drying it or allowing it to dry is known herein as "treating" the substrate. It is contemplated that, as the solvent evaporates, the composition will form a film on the substrate. The dried layer of the composition is known herein as "a film."

In an embodiment, the composition includes: an antimicrobial component that includes at least one quaternary ammonium compound; a synthetic polymer that includes: at least one cationic monomer $A_b$, optionally, at least one anionic monomer $B_a$, and optionally, at least one non-ionic monomer $C_a$; an organic acid; and a surfactant selected from cationic surfactants, amphoteric surfactants and combinations thereof, wherein the composition is free of non-ionic surfactants.

As used herein, the terms "free of non-ionic surfactants" and "non-ionic surfactant free" refer to a composition, mixture, or ingredients that do not contain non-ionic surfactants, for example, non-ionic alkyl glycol ethers, alkoxylated fatty alcohols, alkoxylated oxoalcohols, alkoxylated fatty acid alkyl esters, fatty acid amides, alkoxylated fatty acid amides, polyhydroxy fatty acid amides, alkyl phenol polyglycol ethers, alkyl (poly)glucosides or to which the same has not been added.

In an embodiment, the pH of the composition ranges from about 0.5 to about 5. In another embodiment, the pH of the composition is less than 5. In another embodiment, the pH of the composition ranges from 2 to 4.9. In yet another embodiment, the pH of the composition ranges from 3 to 4.8. In an embodiment, the pH of the composition ranges from 0.5 to 3.

The antimicrobial compositions of the present disclosure include at least one quaternary ammonium compound. In an embodiment, the quaternary ammonium compound is an antimicrobial "quat." The term "quaternary ammonium compound" or "quat" generally refers to any composition with the following formula:

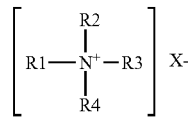

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an embodiment, groups R1, R2, R3, and R4 each have less than a C20 chain length. $X^-$ is an anionic counterion. The term "anionic counterion" includes any ion that can form a salt with quaternary ammonium. Examples of suitable counterions include halides such as chlorides, bromides, fluorides, and iodides, sulphonates, propionates, methosulphates, saccharinates, ethosulphates, hydroxides, acetates, phosphates, carbonates, bicarbonates, and nitrates. In an embodiment, the anionic counterion is chloride.

In some embodiments, quaternary ammoniums having carbon chains of less than 20 or C2-C20 are included in compositions of the present disclosure. In other embodiments, quaternary ammoniums having carbon chains of C6-C18, C12-C18, C12-C16 and C6-C10 are included in compositions of the present disclosure. Examples of quaternary ammonium compounds useful in the present disclosure include, but are not limited to, alkyl dimethyl benzyl ammonium chloride, alkyl dimethyl ethylbenzyl ammonium chloride, octyl decyl dimethyl ammonium chloride, dioctyl dimethyl ammonium chloride, and didecyl dimethyl ammonium chloride. A single quaternary ammonium or a combination of more than one quaternary ammonium may be included in compositions of the present disclosure. Further examples of quaternary ammonium compounds useful in the present disclosure include, but are not limited to, benzethonium chloride, ethylbenzyl alkonium chloride, ethyl benzethonium chloride, myristyl trimethyl ammonium chloride, methyl benzethonium chloride, cetalkonium chloride, cetrimonium bromide (CTAB), carnitine, dofanium chloride, tetraethyl ammonium bromide (TEAB), domiphen bromide, benzododecinium bromide, benzoxonium chloride, choline, denatonium, and mixtures thereof.

In some embodiments depending on the nature of the R group, the anion, and the number of quaternary nitrogen atoms present, the antimicrobial quaternary ammonium compounds may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercial available under the tradenames Rhodaquat® M242C/29 and Dehyquart® A; alkyltrimethyl ammonium chloride, commercially available as Arquad® 16; alkylaryltrimethyl ammonium chloride; and cetyldimethyl ethylammonium bromide, commercially available as Ammonyx® DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Some non-limiting examples of monoalkyldimethylbenzyl ammonium salts include alkyldimethylbenzyl ammonium chlorides, commercially available as Barquat® from Lonza Inc.; and benzethonium chloride, commercially available as Lonzagard®, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC® 2125M from Stepan Company, and Barquat® 4250 from Lonza Inc. Other examples include N,N-benzyldimethyloctylammonium chloride, N,N-benzyldimethyldecylammonium chloride, N-dodecyl-N-benzyl-N,N-dimethylamm nium chloride, N-tetradecyl-N-benzyl-N,N-dimethylammonium chloride, N-hexadecyl-N,N-dimethyl-N-benzylammonium chloride, N,N-dimethyl N-benzyl N-octadecyl ammonium chloride.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac® 22 from Lonza Inc.; didecyl dimethyl ammonium chloride commercially available as Bardac® 2250 from Lonza Inc.; dioctyl dimethyl ammonium chloride, commercially available as Bardac® LF and Bardac® LF-80 from Lonza Inc.; and octyl decyl dimethyl ammonium chloride sold as a mixture with didecyl and dioctyl dimethyl ammonium chlorides, commercially available as Bardac® 2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat® 6060/CPC from Zeeland Chemical Inc.; 1-[3-chloroalkyl]-3,5,7-triaza-1-azoniaadamantane, commercially available as Dowicil® 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dim ethyl ethylb enzyl ammonium cyclohexyl sulfamate.

Bis-quaternary ammonium salts contain two symmetric quaternary ammonium moieties having the general formula:

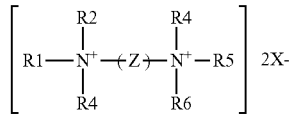

where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride]hexane or triclobisonium chloride.

In an embodiment, the quaternary ammonium compound is a medium to long chain alkyl R group, such as from 8 carbons to about 20 carbons, from 8 carbons to about 18 carbons, from about 10 to about 18 carbons, and from about 12 to about 16 carbons, and providing a soluble and good antimicrobial agent.

In an embodiment, the quaternary ammonium compound is a short di-alkyl chain quaternary ammonium compound having an R group, such as from 2 carbons to about 12 carbons, from 3 carbons to about 12 carbons, or from 6 carbons to about 12 carbons.

The composition may include from about 100 to about 20,000 ppm of one or more quaternary ammonium compounds. In various embodiments, the composition includes from about 500 to about 20,000 ppm; from about 500 to about 10,000 ppm; or from about 500 to about 5000 ppm of one or more quaternary ammonium compounds.

Polymers suitable for use in compositions of the present disclosure include synthetic polymers having: at least one cationic monomer $A_b$, optionally, at least one anionic monomer $B_a$, and optionally, at least one non-ionic monomer $C_a$. In one embodiment, the synthetic polymer includes its homopolymer, copolymer, terpolymer, block copolymer, random polymer, linear polymer, comb polymer or branched polymer.

Any combination of these types of monomers may be used. For example, suitable polymers include but are not limited to those comprising, consisting of or consisting essentially of at least one monomer of type $A_b$ and at least one monomer of type $B_a$ and polymers comprising, consisting of or consisting essentially of at least one monomer of type $A_b$ and at least one momoner of type $C_a$, and polymers comprising, consisting of or consisting essentially of at least one of each of the three types of monomer.

In an embodiment the cationic monomer $A_b$ includes an ammonium group of formula —NR3+, wherein R, which is identical or different, represents a hydrogen atom, an alkyl group comprising 1 to 10 carbon atoms, or a benzyl group, optionally carrying a hydroxyl group, and comprise an anion (counter-ion). Examples of anionic counter-ions are halides such as chloride and bromides, sulphates, hydrosulphates, alkylsulphates (for example comprising 1 to 6 carbon atoms), sulfonates, phosphates, nitrates, citrates, formates, and acetates.

Examples of cationic monomer $A_b$ include, but are not limited to:

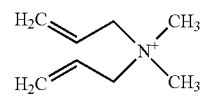

Diallyldimethylammonium halides such as diallyldimethylammonium chloride (DADMAC) or the corresponding bromide. Alternatively, the counter ion may be sulphate, nitrate or phosphate. Similar momomer units, such as those in which one or more of the $CH_3$ groups is replaced by a $C_2$ to 12 for example a $C_{2\ to\ 6}$ alkyl group or one or more of the $CH_2$ groups is replaced by an alkyl group having from 2 to 12, for example from 2 to 6 carbon atoms may be used. In other words, other similar commercially available monomers or polymers containing such monomers may be used.

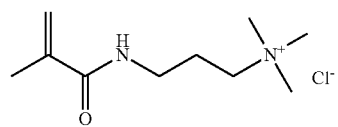

N,N,N-trimethyl-3-((2-methyl-1-oxo-2-propenyl)amino)-1-propanaminium halides, such as the chloride (MAPTAC, also known as methacryl-amido(propyl)-trimethyl ammonium chloride).

Additional examples of cationic monomer $A_b$ include, but are not limited to:

1. aminoalkyl (meth)acrylates, aminoalkyl (meth)acrylamides,
2. monomers, including particularly (meth)acrylates, and (meth)acrylamides derivatives, comprising at least one secondary, tertiary or quaternary amine function, or a heterocyclic group containing a nitrogen atom, vinylamine or ethylenimine;
3. diallyldialkyl ammonium salts;
4. their mixtures, their salts, and macromonomers deriving from therefrom;
5. dimethylaminoethyl (meth)acrylate, dimethylaminopropyl (meth)acrylate, ditertiobutylaminoethyl (meth)acrylate, dim ethyl aminomethyl (meth)acrylamide, dimethylaminopropyl (meth)acrylamide;
6. ethylenimine, vinylamine, 2-vinylpyridine, 4-vinylpyridine;
7. trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylamm onium ethyl acrylate chloride, trimethyl ammonium ethyl (meth) acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
8. diallyldimethyl ammonium chloride,
9. monomers having the following formula A(II):

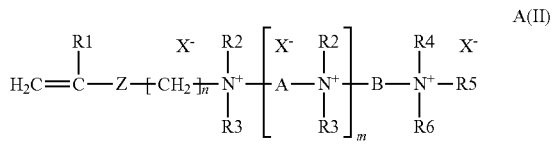

A(II)

wherein $R_1$ is a hydrogen atom or a methyl or ethyl group; $R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups; m is an integer from 0 to 10, for example 1; n is an integer from 1 to 6, preferably 2 to 4; Z represents a —C(O)O— or —C(O)NH— group or an oxygen atom; A represents a $(CH_2)_p$ group, p being an integer from 1 to 6, preferably from 2 to 4; B represents a linear or branched $C_2$-$C_{12}$, typically $C_3$-$C_6$, polymethylene chain optionally interrupted by one or more heteroatoms or heterogroups, in particular O or NH, and optionally substituted by one or more hydroxyl or amino groups, preferably hydroxyl groups; X, which are identical or different, represent counterions, and their mixtures, and macromonomers deriving therefrom.

Other cationic monomers include compounds of general formula A(I):

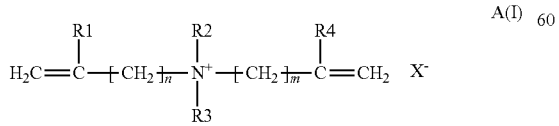

A(I)

in which: $R_1$ and $R_4$, independently of each other, represent a hydrogen atom or a linear or branched $C_1$-$C_6$ alkyl group; $R_2$ and $R_3$, independently of each other, represent an alkyl, hydroxyalkyl or aminoalkyl group in which the alkyl group is a linear or branched $C_1$-$C_6$ chain, preferably a methyl group; n and m are integers between 1 and 3; X, which may be identical or different, represent counterions which are compatible with the water-soluble or water-dispersible nature of the polymer. In one embodiment, X is selected from the group of halide anions, sulfate anions, hydrogen sulfate anions, phosphate anions, nitrate anions, citrate anions, formate anions, or acetate anions.

The polymers used in the present invention may have a polyampholyte structure such that the charge and surface adsorption are determined by pH. In an embodiment, the polymer is an acrylic acid amine-functional polymer. Examples of suitable hydrophilic polymers are described in U.S. Pat. Nos. 6,569,261, 6,593,288, 6,703,358 and 6,767,410, the disclosure of these documents is incorporated herein by reference. These documents describe water-soluble or water-dispersible copolymers including, in the form of polymerized units, (1) at least one amine-functional monomer, (2) at least one hydrophilic monomer with an acidic nature and (3) optionally at least one neutral hydrophilic monomer having an ethylenic unsaturation. The copolymers include quaternized ammonium acrylamide acid copolymers.

Examples of the anionic monomer $B_a$ include, but are not limited to, acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the ammonium and alkali metal salts of these acids.

Examples of the non-ionic monomer $C_a$ include, but are not limited to, 2-(Dimethylamino)ethyl methacrylate (DMAEMA),

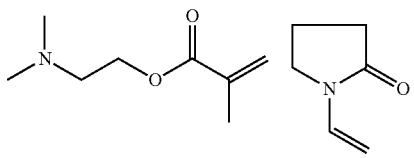

N-vinyl pyrrolidone (NVP), N-vinylimidazole, acrylamide, and

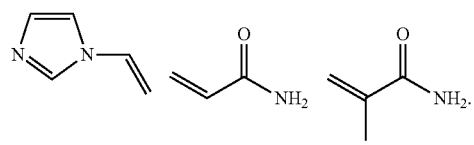

methacrylamide.

An example of a polymer suitable for use in the composition of the present disclosure is a polymer comprising, consisting of or consisting essentially of DMAEMA, MAPTAC and methylacrylic acid.

Suitable polymers include those sold under the trade name Mirapol®, for example as Mirapol® Surf-SHO, Mirapol® Surf-S110, Mirapol® Surf-5200 or Mirapol® Surf-5500 available from Solvay, Novecare.

Other suitable polymers include polymers comprising, consisting of or consisting essentially of DADMAC and acrylamide, such as those sold under the trade name Polyquat® 7 or PQ7 from Surfacare or under the trade name Merquat® S from Lubrizol. Other suitable polymers include polymers comprising, consisting of or consisting essentially of DADMAC and methacrylamide and/or, acrylic acid or methacrylic acid.

Polymers comprising, consisting of or consisting essentially of MAPTAC and acrylamide or methacrylamide are also suitable for use in the composition of the present disclosure. Also suitable are polymers comprising, consisting of or consisting essentially of MAPTAC and vinyl pyrrolidone, such as Polyquat® 28. Suitable polymers include those sold under the trade names Polyquart® Pro. (which is polyquat 28 plus silicone) and Polyquart® Ampo 140 from BASF.

Other suitable polymers include polymers comprising, consisting of or consisting essentially of MAPTAC and acrylic acid or methacrylic acid, such as those sold under the trade name Polyquat® Ampho, eg Polyquat® Ampho 149.

Polymers comprising, consisting of or consisting essentially of DMAEMA and vinylpyrrolidone are suitable for use in the composition of the present disclosure. An example of such a polymer is sold under the name PQ11 by BRB International.

Other suitable polymers include polymers comprising, consisting of or consisting essentially of DMAEMA and acrylamide, such as the polymer sold under the trade name Polyquat® 5.

In an embodiment, the molecular weight of the polymer ranges from about 130,000 g/mol to about 2 million g/mol.

In an embodiment, the amount of polymer in the composition ranges from about 200 ppm to about 4,000 ppm.

Compositions of the present disclosure further include one or more organic acids. In an embodiment, the organic acid is selected from citric, malic, maleic, oxalic, glutaric, succinic, lactic, glycolic, fumaric, acetic, benzoic, propionic, sorbic, tartaric, formic and mixtures of one or more such organic acids. In another embodiment, the counterion acid may be polymeric acid, such as, for example, poly(acrylic acid) or other polycarboxylic acids (e.g. maleic anhydride, methacrylic acid, etc.) or homopolymers or copolymers (e.g. methyl methacrylate, butyl acrylate, etc.) thereof, such as those in the Rhodoline® series available from Solvay. The composition may include from 500 to 7,000 ppm of one or more organic acids.

In compositions of the present disclosure, the surfactant is selected from cationic surfactants, amphoteric surfactants and combinations thereof. Cationic surfactants are surfactants that dissolve in water to result in a net cationic charge. In an embodiment, when present, the cationic surfactant is selected from cationic amine oxides, cationic betaines, propionates, amphoacetates and combinations thereof. Amine oxides, propionates, amphoacetates and betaines are cationic in the acidic pH conditions of the present disclosure. In an embodiment, the propionate is selected from cationic C8-C22 propionates and salts thereof. In another embodiment, the cationic C8-C22 propionate is selected from alkyl ampho(di)propionate, alkyl aminopropionates, alkyl amphopropionates, salts thereof, and combinations thereof. In an embodiment the cationic amphoacetate is selected from amphoacetates according to the following formula:

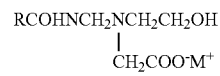

and diamphoacetates according to the following formula:

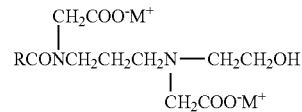

where R is an aliphatic group of 8 to 18 carbon atoms, and M is a cation such as sodium, potassium, ammonium, or substituted ammonium. Sodium lauroamphoacetate, sodium cocoamphoacetate, disodium lauroamphoacetate, and disodium cocoamphodiacetate are preferred in some embodiments.

In an embodiment, the betaine is selected from cationic C8-C22 betaines and salts thereof. In a further embodiment, the cationic C8-C22 betaine is selected from alkyl dimethylbetaines, alkylamidopropyl betaines, alkylampho(di)acetates, salts thereof, and combinations thereof. Where reference is made herein to "salts thereof" for cationic surfactants, these may be any suitable salts. In one embodiment the salt is a salt based on a monovalent cation, such as Na, K, or $NH_4$. In one embodiment, the salt is a salt based on an alkali metal, e.g. Na or K. The use of alternative salts, e.g. alkali earth metal salts such as Ca and Mg could also be contemplated; however the solubility of the product would need to be borne in mind when using such salts.

Amphoteric surfactants contain both a basic and an acidic hydrophilic group and an organic hydrophobic group. In an embodiment, when present, the amphoteric surfactant is selected from sultaines, taurates, and combinations thereof. In an embodiment, the composition includes a combination of one or more cationic and amphoteric surfactants.

In addition to the components described herein, the composition may also include a polar carrier solvent (e.g. water), fragrance, preservative, dye, corrosion inhibitor, builder, cleansing solvent and other components known to be useful in antimicrobial compositions.

The compositions according to the present disclosure include both disinfectant cleaning compositions and concentrates which only differ in the relative proportion of water to that of the other constituents. In an embodiment, concentrated formulations include at least one quaternary ammonium compound in an amount ranging from about 800 ppm to about 40,000 ppm; or about 4,000 ppm to about 30,000 ppm; or about 10,000 ppm to about 25,000 ppm; a synthetic polymer in an amount ranging from about 800 ppm to about 30,000 ppm; or about 2,000 ppm to about 25,000 ppm; or about 4,000 ppm to about 20,000 ppm; an organic acid in an amount ranging from about 1,000 ppm to about 35,000 ppm; or about 5,000 ppm to about 25,000 ppm; or about 15,000 ppm to about 25,000 ppm; a surfactant selected from cationic surfactants, amphoteric surfactants and combinations thereof in an amount ranging from about 2,000 ppm to about 90,000 ppm; or about 10,000 ppm to about 75,000 ppm; or about 20,000 ppm to about 70,000 ppm, wherein the composition is free of non-ionic surfactants.

The concentrate can be used without dilution (concentrate:water 1:0) to extremely dilute dilutions (e.g., 1:10,000). In an embodiment, a range of dilution is from about 1:1 to about 1:1,000. In another embodiment, a range of dilution is from about 1:1 to about 1:500. In yet another embodiment, a range of dilution is from about 1:10 to about 1:128.

Also disclosed are methods of providing a surface with residual antimicrobial action that includes the step of applying a composition of the present disclosure to the surface.

The composition may be applied to a surface by any method, including methods conducted by hand and methods conducted by machine and combinations thereof. For example, composition may be applied by spraying (pump, aerosol, pressure, etc.), pouring, spreading, metering (for example, with a rod or bar), mopping, wiping, brushing, dipping, mechanical application, other application methods, or combination thereof.

In an embodiment, compositions of the present disclosure are suited for use in a "spray and wipe" application. In such an application, the user generally applies an effective amount of the cleaning composition using the pump and within a few moments thereafter, wipes off the treated area with a rag, towel, or sponge, usually a disposable paper towel or sponge.

Compositions of the present disclosure, whether as described herein or in a concentrate or super concentrate form, can also be applied to a hard surface by using a wet wipe. The wipe can be of a woven or non-woven nature. Fabric substrates can include non-woven or woven pouches, sponges, in the form of abrasive or non-abrasive cleaning pads. Such fabrics are known commercially in this field and are often referred to as wipes. Such substrates can be resin bonded, hydroentangled, thermally bonded, meltblown, needlepunched, or any combination of the former.

The non-woven fabrics may be a combination of wood pulp fibers and textile length synthetic fibers formed by well-known dry-form or wet-lay processes. Synthetic fibers such as rayon, nylon, orlon and polyester as well as blends thereof can be employed. The wood pulp fibers should comprise about 30 to about 60 percent by weight of the non-woven fabric, preferably about 55 to about 60 percent by weight, the remainder being synthetic fibers. The wood pulp fibers provide for absorbency, abrasion and soil retention whereas the synthetic fibers provide for substrate strength and resiliency.

The compositions of the present disclosure are absorbed onto the wipe to form a saturated wipe. The wipe can then be sealed individually in a pouch which can then be opened when needed or a multitude of wipes can be placed in a container for use on an as needed basis. The container, when closed, sufficiently sealed to prevent evaporation of any components from the compositions.

Also provided are substrates with residual antimicrobial action that include a substrate wherein at least a portion of the substrate is coated with a composition of the present disclosure. The formulation of the present disclosure may be put to use by application any substrate. Some suitable substrates include, for example, countertops, mirrors, sinks, toilets, light switches, doorknobs, walls, floors, ceilings, partitions, railings, computer screens, keyboards, instruments, etc. Suitable substrates may be found in various settings including, for example, food preparation areas, households, industrial settings, architectural settings, medical settings, sinks, toilets, etc. Substrates may be made of any material; some suitable substrate compositions include, for example, plastic (including, for example, laminates and wall coverings), Formica, metal, glass, ceramic tile, paper (such as, for example, wallpaper), fabric, finished or unfinished wood, etc.

Also provided is the use of a composition of the present disclosure to substantially reduce or control the formation of microbial colonies on or at a surface. In an embodiment, a film formed from the composition kills at least 95% of microorganisms for at least 3 abrasion cycles (alternating 3 wet and 3 dry) according to RSS-12 h. In another embodiment, a film formed from the composition kills at least 95% of microorganisms according to Environmental Protection Agency (EPA) Protocol #01-1A residual self-sanitizing activity test (e.g. 6 abrasion cycles wet and dry each and alternating for a 24 hour claim). In another embodiment, a film formed from the composition kills at least 99.9% of microorganisms for at least 3 abrasion cycles (alternating 3 wet and 3 dry) according to RSS-12 h. In yet another embodiment, a film formed from the composition kills at least 99.9% of microorganisms according to Environmental Protection Agency (EPA) Protocol #01-1A residual self-sanitizing activity test (e.g. 6 abrasion cycles wet and dry each and alternating for a 24 hour claim).

In an embodiment, a film formed from the composition kills at least 95% of gram-positive bacteria and gram-negative bacteria, fungi, or enveloped and non-enveloped viruses for at least 3 abrasion cycles (alternating 3 wet and 3 dry) according to RSS-12 h. In another embodiment, a film formed from the composition kills at least 95% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles wet and dry each and alternating for a 24 hour claim). In another embodiment, a film formed from the composition kills at least 99.9% of gram-positive bacteria and gram-negative bacteria, fungi, or enveloped and non-enveloped viruses for at least 3 abrasion cycles (alternating 3 wet and 3 dry) according to RSS-12 h. In yet another embodiment, a film formed from the composition kills at least 99.9% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles wet and dry each and alternating for a 24 hour claim).

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting.

Example 1—Evaluation of Film Residual Biocidal Activity: EPA Protocol

Films prepared from Formulations A-F (Table 1) were evaluated using RSS-12 h protocol as described above, a modified version the residual self-sanitization (RSS) method, EPA Protocol #01-1A. All the films were prepared by pipetting 150 microliters of the formulations on a (1×1) inch steel substrate and allowed to air dry.

TABLE 1

| Components (actives) | A (ppm) | B (ppm) | C (ppm) | D (ppm) | E (ppm) | F (ppm) |
|---|---|---|---|---|---|---|
| Quaternary ammonium compound (1) | 2800 | 200 | 980 | 1960 | 200 | 400 |
| Quaternary ammonium compound (2) | 12000 | 800 | 3920 | 7840 | 800 | 1600 |
| Fatty triamine surfactant (1) | — | 4000 | — | — | 4000 | 8000 |
| Synthetic polymer (1) | 2000 | 750 | 2000 | 4000 | 750 | 1500 |
| Organic acid (2) | 1600 | — | — | — | 3000 | 3000 |
| Non-ionic surfactant (1) | — | 1000 | — | — | 2000 | 2000 |
| Non-ionic surfactant (2) | 5000 | — | — | — | — | — |
| Organic acid (1) | — | 1188 | 328 | 810 | 7200 | 3872 |
| Organic acid (3) | — | — | 380 | 760 | — | — |
| Amine oxide (1) | 8100 | — | 1350 | 2700 | — | — |
| Sodium carbonate | 3600 | — | — | — | — | — |
| Sodium bicarbonate | 1000 | — | — | — | — | — |
| Dipropylene glycol monoethyl ether | 5000 | — | — | — | — | — |
| Isopropyl alcohol | 6000 | — | — | — | — | — |
| Fragrance | 2000 | — | — | — | — | — |
| Colorant | 32 | — | — | — | — | — |
| Water | Complete to 100 | | | | | |
| Test Microorganism | Enterobacter aerogenes ATCC | | | | | |
| Test Substrate | Steel | Steel | Steel | Steel | Steel | Steel |
| Log Reduction | 0.19 | n/a | 1.41 | 4.82 | 0.28 | 0.8 |

Protocol #01-1A is a method approved by the EPA for measuring long-term sanitization claims (i.e., "kill later" durability claim). Protocol #01-1A, the entire contents of which are incorporated by reference, measures the residual self-sanitizing activity of dried chemical residues (films) on inanimate, hard, non-porous surfaces against bacteria: *Staphylococcus aureus, Klebsiella pneumoniae*, and/or *Enterobacter aerogenes*. In particular, surfaces are inoculated, treated with test product, allowed to dry, then abraded under alternating wet and dry conditions, which are interspersed with several re-inoculations. (FIG. 1).

Formulations A, B, E, and F containing non-ionic surfactant showed poor performance (log reduction less than 3). In comparison, Formulations C and D that have the non-ionic surfactant replaced with amine oxide have a significantly better biocidal performance (greater log reduction). Formulations C and D are at pH 4-4.5 at which the amine oxide is cationic in character (<pH 5). Formulation D provides a robust formulation which passes RSS-12 h (log reduction greater than 3).

Example 2—RSS-12 and Effect of Reduced "Quat" Content

The disinfectant composition D appears to be fairly robust in providing >3 LR even with reduced volumes for treatment. This was further adapted to reduce the total biocide "quat" concentration while keeping all the other components constant as in Formulation D (Table 2). The total "quat" is the sum of ppm of quaternary ammonium compounds (1) and (2). This enables a more environmentally friendly profile while also expanding the compositions to certain applications which require reduced levels of "quat" from a regulatory perspective. All the films were prepared by pipetting 150 microliters of the formulations on a (1×1) inch steel substrate and allowed to air dry. These adapted compositions (G, H, I as shown in Table 2.) were tested with *Enterobacter aerogenes* on steel substrates and passed the RSS-12 protocol with 3.76 LR.

TABLE 2

Reduced "quat" compositions (ppm).

| Components (actives) | G 1000 ppm "quat" | H 500 ppm "quat" | I 200 ppm "quat" |
|---|---|---|---|
| Quaternary ammonium compound (1) | 200 | 100 | 40 |
| Quaternary ammonium compound (2) | 800 | 400 | 160 |
| Synthetic polymer (1) | 4000 | 4000 | 4000 |
| Organic acid (1) | 810 | 810 | 810 |
| Organic acid (3) | 760 | 760 | 760 |
| Amine oxide (1) | 2700 | 2700 | 2700 |
| Water | Complete to 100 | Complete to 100 | Complete to 100 |
| Test Microorganism | *Enterobacter aerogenes* | | |
| Test Substrate | Steel | Steel | Steel |
| Log Reduction | 3.76 | 3.76 | 3.76 |

Example 3—Disinfectant Compositions for RSS-24

Composition D was then further evaluated by (EPA) Protocol #01-1A residual self-sanitizing activity test with 6 alternating abrasion cycles (wet and dry each) for a 24 hour claim. This test is more aggressive than RSS-12 with twice the number of wet and dry abrasions and also involves 5 re-inoculations instead of 3 for RSS-12. Care has to be taken that the % relative humidity (% RH) is within the test range of (45-55)%. Initially, when evaluated with 100 microliters of formulation D on a (1×1) steel substrate with *Enterobacter aerogenes*, 3.97 LR and *Staphylococcus Aureus* 3.86 LR were achieved (Table 3), indicating a pass for RSS-24. The test was repeated for different volumes of formulation dispensed from 25-100 microliters for testing with *S. aureus*. The results in Table 3 show that formulation D provides 24 h disinfection and passes RSS-24 for volumes as low as 25 microliters with *S. aureus*.

TABLE 3

RSS-24 Formula D on Steel (Log Reduction (LR))

| Liquid Volume | *Enterobacter Aerogenes* | *Staphylococcus Aureus* |
|---|---|---|
| 100 microL | 3.97 | 3.86 |
| 50 microL |  | 4.22 |
| 25 microL |  | 4.22 |

Other embodiments of the compositions are outlined in Table 4.

TABLE 4

Compositions tested for RSS-24.

| Components (actives) | J 9800 ppm "quat" | K 5000 ppm "quat" | L 5000 ppm "quat" |
|---|---|---|---|
| Quaternary ammonium compound (1) | 1960 | 1000 | 1001 |
| Quaternary ammonium compound (2) | 7840 | 4000 | 4001 |
| Synthetic polymer (2) |  | — | 800 |
| Synthetic polymer (3) | 800 | 800 |  |
| Organic acid (4) | 2680 | 2300 | 2300 |
| Organic acid (1) | 0 | 0 | 0 |
| Organic acid (3) | 760 | 760 | 760 |
| Amine oxide (2) | 2700 | 2700 | 2700 |
| Water | Complete to 100 | Complete to 100 | Complete to 100 |
| 100 microliters on substrate |  |  |  |
| Test Microorganism | *Enterobacter aerogenes* |  |  |
| Test Substrate | Steel | Steel | Steel |
| Log Reduction | 3.76 | 3.94 | 4.3 |

These compositions are more robust to fluctuations in % RH and to reduce the "quat" level for RSS-24 compositions while providing >3 LR with RSS-24. Formulation K and Formulation L with the two different polymers provide equivalent performance of durable disinfection. In another embodiment, these compositions may be imbibed into a wipe, porous sponge or similar substrate for application on to a surface.

Example 4. Long Lasting Dilutable Concentrates

In another embodiment, it is desirable for some uses to provide a concentrate that may be diluted by mixing with water prior to application by spraying or wiping on to a surface with a wet cloth or other similar method. These concentrates have to be clear and phase stable with high dilution factors, while providing residual self-sanitization as applied in their diluted state.

Compositions M and N are all clear and stable concentrates as outlined in Table 5 formulated at pH ~5.2. These are listed as the active components and not as supplied. The concentrates can be diluted typically ten times (10×), thirty times (30×) or sixty times (60×) prior to use. The respective 30× dilutions of these concentrates (M-30× and N-30×) are shown in Table 6 and providing solutions at pH ~5 or below. The "quat" concentrations for the dilutions are between 500-1000 ppm, and all the other components are also in the typical range shown to be effective with RSS-12 as above. These dilutions were then further applied on steel substrates (100 microliters) and tested by RSS-12 protocol with *E. aerogenes*.

TABLE 5

Dilutable concentrates for RSS-12.

| Components (actives) | M (ppm) | N (ppm) |
|---|---|---|
| Quaternary ammonium compound (1) | 18000 | 3180 |
| Quaternary ammonium compound (2) | 4500 | 12700 |
| Synthetic polymer (2) | 18400 | 22484 |
| Organic acid (4) | 23600 | 19155 |
| Organic acid (3) | 5700 | 2900 |
| Amine oxide (1) | 33700 | 33700 |
| Amine oxide (3) | 33700 | 33700 |
| Water | Balance | Balance |
| Total Actives (% w/w) | 13.76 | 12.78 |

TABLE 6

Dilutions of concentrates.

| Components (actives) | M-30X (ppm) | N-30X (ppm) |
|---|---|---|
| Quaternary ammonium compound (1) | 600 | 106 |
| Quaternary ammonium compound (2) | 150 | 423.3 |
| Synthetic polymer (2) | 613.3 | 749.5 |
| Organic acid (4) | 786.7 | 638.5 |
| Organic acid (3) | 190.0 | 96.7 |
| Amine oxide (1) | 1123.3 | 1123.3 |
| Amine oxide (3) | 1123.3 | 1123.3 |
| Water | Balance | Balance |
| Total Actives (% w/w) | 0.46 | 0.43 |
| 100 microliters |  |  |
| Test Microorganism | *Enterobacter aerogenes* |  |
| Test Substrate | Steel | Steel |
| Log Reduction | 3.49 | 3.37 |

As with low "quat" compositions in Table 2, the polymer and "quat" are at equivalent concentrations. The mixed amine oxides were provided after optimization for concentrate stability and adequate cleaning efficacy of the diluted compositions in use.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

What is claimed is:

1. A concentrate composition comprising:
   a. an antimicrobial component comprising at least one quaternary ammonium compound;
   b. a synthetic polymer comprising:
      i. at least one cationic monomer Ab,
      ii. optionally, at least one anionic monomer Ba, and
      iii. optionally, at least one non-ionic monomer Ca;
   c. an organic acid; and
   d. a surfactant selected from the group consisting of cationic surfactants, amphoteric surfactants and combinations thereof,
   wherein the concentrate composition is free of non-ionic surfactants and optionally comprises water, and the ratio of the concentrate composition to water ranges from about 1:0 to about 1:10,000.

2. The concentrate composition of claim 1, wherein a film formed from the composition kills at least 95% of microorganisms for at least 3 abrasion cycles according to RSS-12h.

3. The concentrate composition of claim 2, wherein the film formed is on a substrate selected from countertops, mirrors, sinks, toilets, light switches, doorknobs, walls, floors, ceilings, partitions, railings, computer screens, keyboards, and instruments.

4. The concentrate composition of claim 2, wherein the film formed is on a substrate and the substrate comprises plastic, laminates, Formica, metal, glass, ceramic tile, paper, fabric, wood, and combinations thereof.

5. The concentrate composition of claim 1, wherein a film formed from the composition kills at least 99.9% of microorganisms for at least 3 abrasion cycles according to RSS-12h.

6. The concentrate composition of claim 1, wherein a film formed from the composition kills at least 99.9% of microorganisms for at least 6 abrasion cycles according to Environmental Protection Agency (EPA) Protocol #01-1 A.

7. The concentrate composition of claim 1, wherein a film formed from the composition kills at least 95% of microorganisms for at least 6 abrasion cycles according to Environmental Protection Agency (EPA) Protocol #01-1 A.

8. The concentrate composition of claim 7, wherein the film formed is on a substrate selected from countertops, mirrors, sinks, toilets, light switches, doorknobs, walls, floors, ceilings, partitions, railings, computer screens, keyboards, and instruments.

9. The concentrate composition of claim 7, wherein the film formed is on a substrate and the substrate comprises plastic, laminates, Formica, metal, glass, ceramic tile, paper, fabric, wood, and combinations thereof.

10. The concentrate composition of claim 1, wherein the composition has a pH of less than about 5.

11. The concentrate composition of claim 1, wherein the composition has a pH ranging from about 0.5 to about 5.

12. The concentrate composition of claim 1, wherein the composition has a pH ranging from about 2 to about 4.9.

13. The concentrate composition of claim 1, wherein the composition has a pH ranging from about 3 to about 4.8.

14. The concentrate composition of claim 1, wherein the composition has a pH ranging from about 0.5 to about 3.

15. The concentrate composition of claim 1, wherein the composition comprises water.

16. The concentrate composition of claim 15, wherein the composition further comprises a solvent in addition to water.

17. The concentrate composition of claim 16, wherein the solvent in addition to water is selected from a polar solvent, a cleansing solvent, or a combination thereof.

18. The concentrate composition of claim 1, wherein ratio of the concentrate composition to water ranges from about 1:1 to about 1:1,000.

19. The concentrate composition of claim 1, wherein ratio of the concentrate composition to water ranges from about 1:1 to about 1:500.

20. The concentrate composition of claim 1, wherein ratio of the concentrate composition to water ranges from about 1:10 to about 1:128.

21. The concentrate composition of claim 1, wherein the concentrate composition is diluted water.

22. The concentrate composition of claim 1, wherein the component selected group consisting of antimicrobial is from the monoalkyldimethylbenzyl ammonium salts, dialkyldimethyl ammonium salts, and combinations thereof.

23. The concentrate composition of claim 1, wherein the monomer Ab is selected from the group consisting of diallyldimethylammonium halides.

24. The concentrate composition of claim 1, wherein the polymer comprises monomer Ba selected from the group consisting of acrylic acid, methacrylic acid, and combinations thereof.

25. The concentrate composition of claim 1, wherein the polymer comprises monomer Ca selected from the group consisting of 2-(dimethylamino)ethyl methacrylate (DMAEMA); N-vinyl pyrrolidone (NVP); N-vinylimidazole; acrylamide; methacrylamide; and combinations thereof.

26. The concentrate composition of claim 1, wherein the organic acid is selected from the group consisting of citric, malic, maleic, lactic, succinic, glutaric, adipic acids, and combinations thereof.

27. The concentrate composition of claim 1, wherein the surfactant comprises a cationic surfactant selected from the group consisting of cationic amine oxides.

28. The concentrate composition of claim 1, wherein the surfactant comprises an amphoteric surfactant selected from the group consisting of sultaines, taurates, and combinations thereof.

29. A method of providing a surface with residual antimicrobial action that comprises the step of applying the concentrate composition of claim 1 to the surface.

30. The method of claim 29, wherein the concentrate composition is diluted with water before applying the composition to the surface.

31. A substrate with residual antimicrobial action comprising a substrate wherein at least a portion of the substrate is coated with the composition of claim 1.

* * * * *